(12) United States Patent
Wellborn et al.

(10) Patent No.: US 8,496,078 B2
(45) Date of Patent: Jul. 30, 2013

(54) SEMI-AUTONOMOUS VEHICLE PROVIDING CARGO SPACE

(75) Inventors: Carl W. Wellborn, Detroit, MI (US); Joseph F. Szczerba, Grand Blanc, MI (US); Jan H. Aase, Oakland Township, MI (US); Brian S. Repa, Beverly Hills, MI (US); Mary Ellen Decaluwe, Oxford, MI (US); Jim K. Rainbolt, Haslett, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 13/016,975

(22) Filed: Jan. 29, 2011

(65) Prior Publication Data

US 2012/0193154 A1 Aug. 2, 2012

(51) Int. Cl.
B62D 53/04 (2006.01)
(52) U.S. Cl.
USPC ............................................ 180/14.2; 701/96
(58) Field of Classification Search
USPC .................... 180/14.1, 14.2, 14.6; 701/96
See application file for complete search history.

(56) References Cited

U.S. PATENT DOCUMENTS

| | | | | |
|---|---|---|---|---|
| 3,830,325 | A | * | 8/1974 | Tarter ............................ 180/14.6 |
| 4,771,838 | A | * | 9/1988 | Ketcham ....................... 180/6.62 |
| 4,909,341 | A | * | 3/1990 | Rippingale et al. ............ 180/9.1 |
| 5,330,020 | A | * | 7/1994 | Ketcham ....................... 180/14.2 |
| 5,810,105 | A | | 9/1998 | Trainer |
| 5,921,708 | A | | 7/1999 | Grundl et al. |
| 6,301,530 | B1 | | 10/2001 | Tamura |
| 6,313,758 | B1 | | 11/2001 | Kobayashi |
| 6,640,164 | B1 | | 10/2003 | Farwell et al. |
| 7,277,784 | B2 | | 10/2007 | Weiss |
| 7,593,811 | B2 | | 9/2009 | Schmidt et al. |
| 7,946,372 | B2 | * | 5/2011 | Shraga et al. ................. 180/197 |
| 8,116,921 | B2 | * | 2/2012 | Ferrin et al. ...................... 701/1 |
| 8,285,456 | B2 | * | 10/2012 | Jensen ............................. 701/48 |
| 8,326,473 | B2 | * | 12/2012 | Simpson et al. ................. 701/22 |
| 8,335,607 | B2 | * | 12/2012 | Gatten et al. ................. 701/31.1 |
| 2005/0162106 | A1 | | 7/2005 | Cho et al. |
| 2007/0233337 | A1 | | 10/2007 | Plishner |
| 2008/0059007 | A1 | | 3/2008 | Whittaker et al. |
| 2009/0012666 | A1 | * | 1/2009 | Simpson et al. ................. 701/23 |
| 2010/0044998 | A1 | | 2/2010 | Franchineau |
| 2010/0049374 | A1 | * | 2/2010 | Ferrin et al. ...................... 701/1 |
| 2010/0065344 | A1 | * | 3/2010 | Collings, III ................. 180/2.1 |
| 2012/0245796 | A1 | * | 9/2012 | Yu et al. ......................... 701/41 |

FOREIGN PATENT DOCUMENTS

| | | |
|---|---|---|
| JP | 2010015194 | 2/2010 |
| WO | WO0223296 | 3/2002 |

OTHER PUBLICATIONS

U.S. Appl. No. 13/016,969, filed Jan. 29, 2011, Wellborn, et al.

* cited by examiner

Primary Examiner — Kevin Hurley

(57) ABSTRACT

A semi-autonomous vehicle includes a chassis having a repository on a plurality of wheels, a propulsion system, a steering system, a braking system, an extra-vehicle communications system, and an extra-vehicle sensory system. A control system of the semi-autonomous vehicle is operatively coupled to the propulsion system, the steering system, and the braking system and signally connected to the extra-vehicle sensory system and the extra-vehicle communications system. A non-load-bearing coupling mechanism of the semi-autonomous vehicle includes a connector, a flexible mechanical link element and a communications link.

19 Claims, 2 Drawing Sheets

SEMI-AUTONOMOUS VEHICLE PROVIDING CARGO SPACE

TECHNICAL FIELD

This disclosure is related to semi-autonomous vehicles.

BACKGROUND

The statements in this section merely provide background information related to the present disclosure and may not constitute prior art.

Known vehicle systems may have limited stowage space.

Trailers that are mechanically coupled to a host or parent vehicle are known. Vehicles equipped to mechanically tow a trailer device have added features, including towing hitches and powertrain cooling system enhancements that add mass and components to a vehicle.

SUMMARY

A semi-autonomous vehicle includes a chassis having a repository on a plurality of wheels, a propulsion system, a steering system, a braking system, an extra-vehicle communications system, and an extra-vehicle sensory system. A control system of the semi-autonomous vehicle is operatively coupled to the propulsion system, the steering system, and the braking system and signally connected to the extra-vehicle sensory system and the extra-vehicle communications system. A non-load-bearing coupling mechanism of the semi-autonomous vehicle includes a connector, a flexible mechanical link element and a communications link.

BRIEF DESCRIPTION OF THE DRAWINGS

One or more embodiments will now be described, by way of example, with reference to the accompanying drawings, in which.

DETAILED DESCRIPTION

Figure 1:
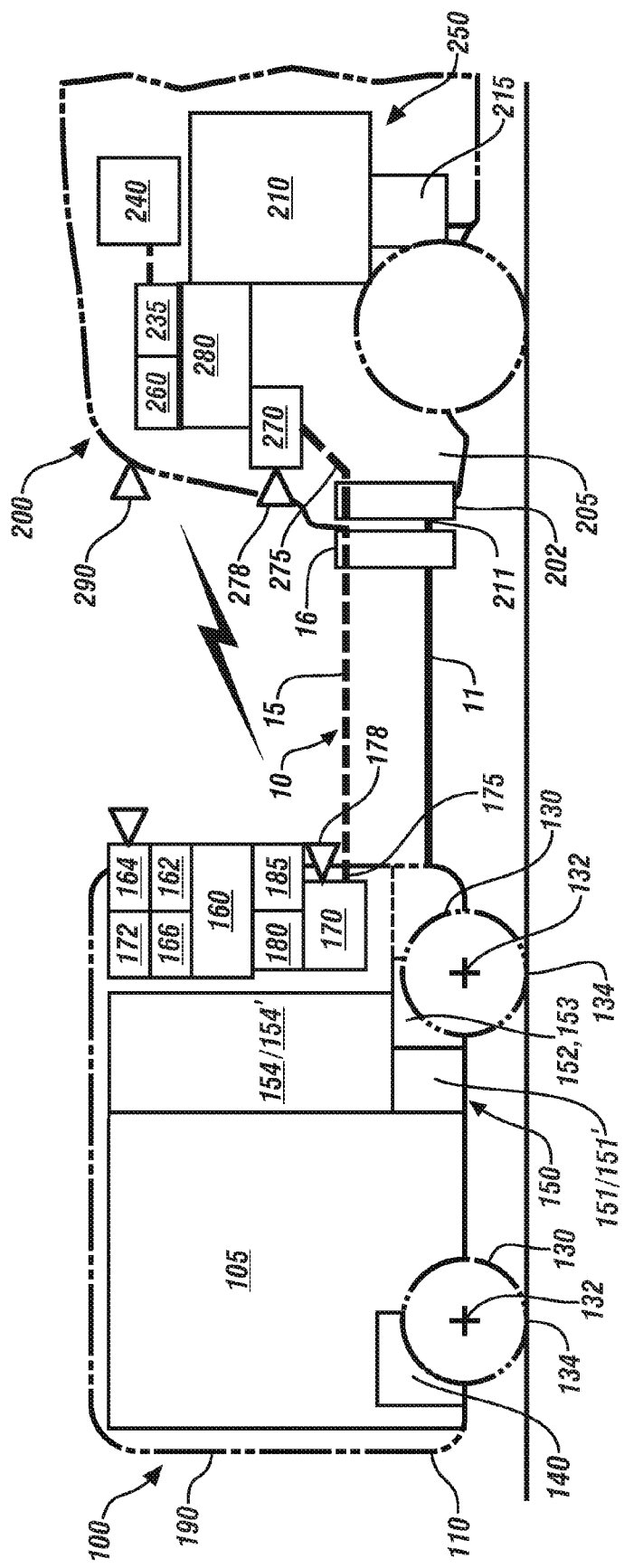
FIG. 1 schematically illustrates an embodiment of a semi-autonomous vehicle employing a non-load-bearing coupling mechanism coupled to a parent vehicle in accordance with the present disclosure.
Figure 2:
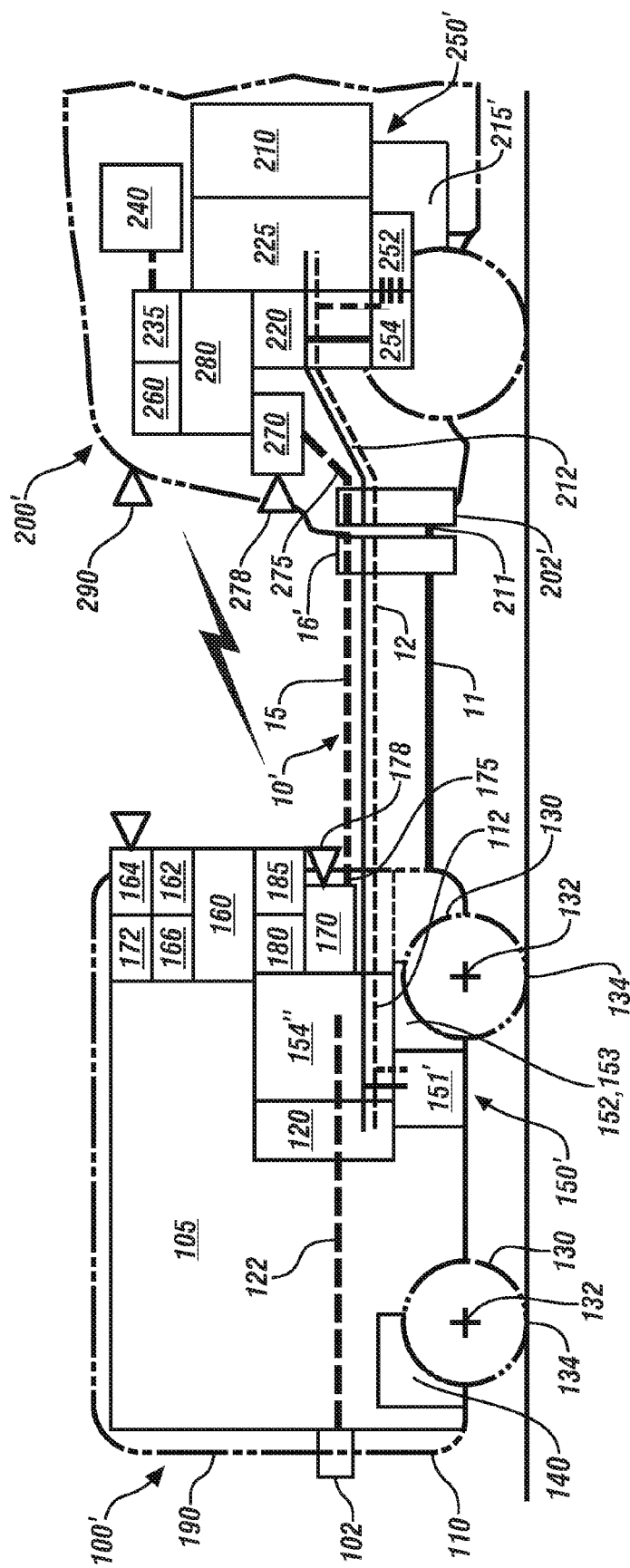
FIG. 2 schematically illustrates an embodiment of a semi-autonomous vehicle employing a non-load-bearing coupling mechanism coupled to a parent vehicle having a propulsion system including an internal combustion engine and electrically-powered torque machine(s) and in accordance with the disclosure.

Referring now to the drawings, wherein the showings are for the purpose of illustrating certain exemplary embodiments only and not for the purpose of limiting the same, FIGS. 1 and 2 schematically illustrate embodiments of a semi-autonomous vehicle 100 that is couplable to a parent vehicle 200, a portion of which is shown. The semi-autonomous vehicle 100 employs a non-load-bearing coupling mechanism 10 to couple to the parent vehicle 200. The semi-autonomous vehicle 100 is configured to operate in a close-order platoon with the parent vehicle 200 when coupled thereto.

The semi-autonomous vehicle 100 is preferably a steerable, self-propelled, multi-axled, multi-wheeled vehicle equipped with systems providing autonomously controllable steering, propulsion, and braking functions and extra-vehicle communications. The semi-autonomous vehicle 100 includes a lockable, sealable repository 105 suitable for stowing and conveying effects of the vehicle operator. The repository 105 is configured to be readily accessible. The semi-autonomous vehicle 100 includes a chassis 110, a propulsion system 150, a braking system 130, a steering system 140, a sensory system 160, an extra-vehicle communications system 170, control system 180, and the non-load-bearing coupling mechanism 10. The parent vehicle 200 exerts no pulling force on the semi-autonomous vehicle 100 in operation. The semi-autonomous vehicle 100 is preferably equipped with taillights including signal lamps, indicator lamps, and brake lamps that are activatable in concert with corresponding taillights on the parent vehicle 200.

The chassis 110 includes a framework that is supported on axles 132 on which wheels 134 employing low rolling resistance tires are rotatably mounted. The chassis 110 is configured such that weight of the semi-autonomous vehicle 100 including any cargo contained in the repository 105 is distributed to the axles 132 and wheels 134 in a suitable manner that allows the semi-autonomous vehicle 100 to bear its own weight and be statically and dynamically balanced thereon. As such, no weight from the semi-autonomous vehicle 100 is transferred to the parent vehicle 200.

The propulsion system 150 is configured to transfer tractive torque to the wheels 134 using suitable propulsion mechanisms. The propulsion system 150 includes a torque-generative device 151, a torque-transmission device 152, a driveline 153 coupled to one or more of the wheels 134, and an energy storage/conversion system 154.

In one embodiment, the torque-generative device 151 is an internal combustion engine and the energy storage/conversion system 154 is a liquid fuel storage tank that supplies fuel thereto, with the internal combustion engine mechanically coupled to one or more of the vehicle wheels 134 via a suitable torque-transmission device 152 and driveline 153.

In one embodiment, the torque-generative device 151' includes one or a plurality of multiphase electric motors. The energy storage/conversion system 154' includes a liquid fuel storage tank, an electro-chemical fuel cell device, and one or a plurality of electrical power inverters. The liquid fuel storage tank supplies fuel to the electro-chemical fuel cell device, which generates electric power that is transferable via the electrical power inverter(s) to the electric motor(s) 151' mechanically coupled to one or more of the vehicle wheels 134 via a suitable torque-transmission device 152 and driveline 153.

In one embodiment, the torque-generative device 151' includes one or a plurality of multiphase electric motors. The energy storage/conversion system 154" includes a high-voltage electrical power storage device and one or a plurality of electrical power inverters. The high-voltage electrical power storage device supplies electric power that is transferable via the electrical power inverter(s) to the electric motor(s) 151' mechanically coupled to one or more of the vehicle wheels 134 via a suitable torque-transmission device 152 and driveline 153. In one embodiment, each torque-generative device 151' including the multiphase electric motor is directly rotatably attached to one of the wheels 134 that are mounted on the axles 132.

In one embodiment, the propulsion system 150' includes a single multiphase electric motor 151' that is rotatably attached to one of the wheels 134. In one embodiment, the propulsion system 150' includes a plurality of multiphase electric motors 151' that are rotatably attached to corresponding wheels 134, including first and second multiphase electric motors 151' that are attached to the wheels 134 mounted on opposite ends of one of the axles 132. In such an embodiment, the remaining wheels 134 are mounted on a second of the axles 132 in a caster arrangement.

FIG. 2 shows an embodiment of the semi-autonomous vehicle 100' coupled to parent vehicle 200'. The semi-autonomous vehicle 100' includes the high-voltage energy storage/conversion system 154", propulsion system 150' and an electric power management system 120. The high-voltage energy storage/conversion system 154" includes a high-voltage electric power storage system and power inverter(s). The electric power management system 120 manages electric power flow between the high-voltage energy storage/conversion system 154", an AC power connection 102 and a high-voltage electric power bus 12 of the coupling mechanism 10'. The AC power connection 102 is configured to electrically connect to a stationary electric power source. The electric power management system 120 electrically connects to the high-voltage energy storage/conversion system 154" via a high-voltage electric power bus 112. The high-voltage energy storage/conversion system 154" includes a plurality of high-voltage rechargeable battery elements, e.g., lithium-ion-based battery elements. The electric power management system 120 electrically connects to the AC power connection 102 via power bus 122 and to the high-voltage electric power bus 12 of the coupling mechanism 10' via high-voltage electric power bus 112. The electric power management system 120 controls flow of electric power originating from a stationary power source through the AC power connection 102 to charge the high-voltage electric power storage system of the high-voltage energy storage/conversion system 154". The electric power management system 120 controls flow of electric power originating from a high-voltage electrical energy power management system 220 of the parent vehicle 200' to the high-voltage electric power storage system 154" via the high-voltage electric power bus 12 of the coupling mechanism 10'. The electric power management system 120 operatively connects to the power inverter of the high-voltage energy storage/conversion system 154" to convert high-voltage DC electric power to AC power for operating the torque-generative device 151' and to convert AC power generated by the torque-generative device 151' to high-voltage DC electric power that may be stored in the high-voltage energy storage/conversion system 154". The electric power management system 120 includes monitoring algorithms to monitor parameters associated with the high-voltage energy storage/conversion system 154", including, e.g., a state-of-charge. Such information is communicated to the control system 180, and preferably to the communications system 280 of the parent vehicle 200'.

Each multiphase electric motor 151' is preferably configured to function as a torque motor and as an electric power generator. The power inverter of the high-voltage energy storage/conversion system 154' converts high-voltage DC electric power to AC power for operating each multiphase electric motor 151' and converts AC power generated by each multiphase electric motor 151' to high-voltage DC electric power during regenerative braking.

The braking system 130 is configured to apply braking force to the wheels 134 in response to a braking command. In one embodiment, the braking system 130 includes a system to activate the electric motor(s) 151' that is attached to the wheels 134 to apply electric power to the electric motor(s) 151' in a manner that reacts torque to cause vehicle braking and coincidentally generates electric power, referred to as regenerative braking. The braking system 130 may include an electrically-activated mechanical braking system that includes a disc brake system that is activated by a controllable solenoid device. The braking system 130 preferably has antilock braking capability and traction control.

The steering system 140 is configured to provide lateral motion control and thus control direction of travel of the semi-autonomous vehicle 100. In one embodiment, the steering system 140 includes an electrically-actuated rack-and-pinion steering system coupled to one or a plurality of the wheels 134 to control the orientation of the one of the wheels 134 and thus control the direction of travel of the semi-autonomous vehicle 100. In one embodiment, the electrically-actuated rack-and-pinion steering system is coupled to one of the wheels 134 in a forward position on the semi-autonomous vehicle 100. In one embodiment, the electrically-actuated rack-and-pinion steering system is coupled to one of the wheels 134 in a rearward position on the semi-autonomous vehicle 100. In one embodiment, the steering system 140 includes a control system that independently controls rotational speeds of electric motors 151' that are mounted on opposite ends of one of the axles 132. Direction of travel of the semi-autonomous vehicle 100 is controlled by controlling rotational speeds of the electric motors 151', including differentially controlling the rotational speeds of the electric motors 151' to effect a change in direction in the semi-autonomous vehicle 100.

The sensory system 160 preferably includes an extra-vehicle spatial monitoring system 162 and a chassis monitoring system 166. A primary function of the sensory system 160 is to enable to the semi-autonomous vehicle 100 to close-order follow the parent vehicle 200 in a controlled manner.

The spatial monitoring system 162 includes a control module that connects to a front sensor 164 to capture and analyze signals associated with remote objects proximate to the semi-autonomous vehicle 100. The front sensor 164 is positioned within the semi-autonomous vehicle 100 in a relatively unobstructed position to permit forward-monitoring, preferably in a position that facilitates detecting and identifying a target device 290 mounted on the parent vehicle 200 when coupled thereto. Data from the front sensor 164 is periodically collected and analyzed. The spatial monitoring system 162 preferably determines a linear range, relative speed, and trajectory of the parent vehicle 200 based upon signals from the front sensor 164 associated with detecting and identifying the target device 290. In one embodiment the front sensor 164 quantifies a range and a lateral position of the parent vehicle 200 relative to the semi-autonomous vehicle 100. The spatial monitoring system 162 communicates the range and lateral position of the parent vehicle 200 to the control system 180. There may be a single one or a plurality of front sensors 164 positioned within the semi-autonomous vehicle 100 in relatively unobstructed positions. In one embodiment the front sensor 164 includes short-range radar devices to assist in monitoring the region in front of the semi-autonomous vehicle 100, i.e., the parent vehicle 200. The front sensor 164 may also assist in monitoring oncoming traffic. The front sensor 164 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The front sensor 164 may include a radio-frequency interrogation device. The possible object-locating devices may include charged-coupled devices (CCD) or complementary metal oxide semi-conductor (CMOS) video image sensors, and other known camera/video image processors which utilize digital photographic methods to view forward objects including the target device 290 of the parent vehicle 200.

Such sensing systems are employed for detecting and locating objects in automotive applications and are useable with systems including adaptive cruise control system 240, collision avoidance, pre-crash safety, and side-object detection. Such sensing devices may be configured to provide rear obstacle detection functionality. The spatial monitoring system 162 may include other sensors for detecting and quantifying locations of proximate remote objects, including stationary and moving objects. Placement of the sensors permits the spatial monitoring system 162 to monitor the parent vehicle 200 and to monitor traffic flow including proximate object vehicles and other objects around the semi-autonomous vehicle 100 and the parent vehicle 200.

The chassis monitoring system 166 includes devices for monitoring vehicle operation to determine motion states of the semi-autonomous vehicle 100. The vehicle motion states preferably include, e.g., vehicle speed, steering angle of the steerable wheels, and yaw rate. The chassis monitoring system 166 preferably includes inertial sensors, e.g., rate gyros and accelerometers. The chassis monitoring system 166 estimates the vehicle motion states, such as yaw-rate and lateral speed, and estimates lateral offset and heading angle of the semi-autonomous vehicle 100. The measured yaw rate is combined with steering angle measurements to estimate lateral speed. The chassis monitoring system 166 generates signals associated with vehicle motion states that may be monitored by other vehicle control systems for vehicle control and operation, and may be communicated to the parent vehicle 200. One exemplary vehicle control system may include an autonomous lane change system. A global position sensing (GPS) system 172 including a GPS locator may also be included. The GPS system 172 generates and broadcasts a signal indicating a present location of the semi-autonomous vehicle 100, and may be used for tracking and as a theft deterrent.

The extra-vehicle communications system 170 provides communications between the semi-autonomous vehicle 100 and the parent vehicle 200. In one embodiment, the extra-vehicle communications system 170 includes the high-speed communications link 15 for communicating between the semi-autonomous vehicle 100 and the parent vehicle 200 that is an element of the coupling mechanism 10. Alternatively or in addition, the communication system 170 may include the wireless communications system 178 to communicate with a corresponding communications system 270 of the parent vehicle 200. Wireless communications may include any suitable communications protocol, including, e.g., one based upon IEEE 802.11. The semi-autonomous vehicle 100 may be configured to communicate with other vehicles, systems, and controllers under specific circumstances when the communication system 170 includes the wireless communications system 178.

The control system 180 includes a plurality of control modules configured to monitor operation of the semi-autonomous vehicle 100, including inputs from the braking system 130, steering system 140, propulsion system 150, and the sensory system 160 and signals originating from the parent vehicle 200. The control system 180 generates commands for operating the braking system 130, steering system 140, and propulsion system 150 to facilitate tracking and following of the parent vehicle 200 by the semi-autonomous vehicle 100. The control system 180 operatively and signally connects to the propulsion system 150, the steering system 140, the braking system 130, and the sensory system 160. The control system 180 receives information from an HMI system 235 of the parent vehicle 200 via the communications system 170, including information originating from the adaptive cruise control system 240. The control system 180 includes executable control schemes for controlling operation of the semi-autonomous vehicle 100, including when coupled to the parent vehicle 200. The control schemes preferably entail operation of the semi-autonomous vehicle 100 and management of electric power transfer from the parent vehicle 200' when so equipped. Operation of the semi-autonomous vehicle 100 includes operation when electrically coupled to the parent vehicle 200, including when operating on public and private highways in a close-order platooning configuration. Operation of the semi-autonomous vehicle 100 includes operation when decoupled from the parent vehicle 200.

The non-load-bearing coupling mechanism 10 includes connector 16 that is configured to mechanically couple to a mechanical coupling 211 of a connector 202 of the parent vehicle 200. The coupling mechanism 10 of the semi-autonomous vehicle 100 preferably includes a high-speed communications link 15, and a flexible mechanical link element 11 that terminates at connector 16. The high-speed communications link 15 connects to the high-speed databus 175 of the semi-autonomous vehicle 100 that connects to the communications system 170 of the semi-autonomous vehicle 100. The high-speed communications link 15 is employable to connect to and effect communications with the communications system 270 via a high-speed databus 275 of the parent vehicle 200. The flexible mechanical link element 11 preferably connects between the chassis 110 of the semi-autonomous vehicle 100 and a chassis 205 of the parent vehicle 200. The flexible mechanical link element 11 preferably includes a high tensile strength cable sufficient to function as a safety chain to prevent uncontrolled dissociation of the semi-autonomous vehicle 100 from the parent vehicle 200 in event of a fault. In one embodiment, the flexible mechanical link element 11 includes a flexible mechanical shroud element that is configured to become a rigid connection when extended to a predetermined length. As such, the flexible mechanical link element 11 may also function to prevent uncontrolled collision between the semi-autonomous vehicle 100 and the parent vehicle 200. The non-load-bearing coupling mechanism 10 may be configured under specific circumstances to disconnect the connector 16 from the connector 202 of the parent vehicle 200.

By way of definition, the semi-autonomous vehicle 100 couples to the parent vehicle 200 when connector 16 of the non-load-bearing coupling mechanism 10 mechanically connects to the connector 202 of the parent vehicle 200, the extra-vehicle communications system 170 periodically and ongoingly communicates with the communications system 270 of the parent vehicle 200, and the front sensor 164 of the semi-autonomous vehicle 100 regularly detects and identifies the target device 290 mounted on the parent vehicle 200. There is a fault in the coupling between the semi-autonomous vehicle 100 and the parent vehicle 200 when there is an interruption in any one of the mechanical connection to the connector 202, the extra-vehicle communications to the communication system 270, and the detection and identification of the target device 290 that is non-remediable. Other faults include a mechanical fault, an electrical fault, a control system fault or a communications fault associated with one of the propulsion system 150, the braking system 130, the steering system 140, the sensory system 160, the extra-vehicle communications system 170, and the control system 180 that interrupt the mechanical connection to the connector 202, the extra-vehicle communications to the communication system 270, or the detection and identification of the target device 290.

The non-load-bearing coupling mechanism 10 may disconnect the connector 16 from the connector 202 of the parent vehicle 200 under a condition when the semi-autonomous vehicle 100 is not moving. The non-load-bearing coupling mechanism 10 may disconnect the connector 16 from the connector 202 of the parent vehicle 200 under a condition when a fault in the coupling between the semi-autonomous vehicle 100 and the parent vehicle 200 is detected, and in response to other vehicle operating conditions.

The parent vehicle 200 is a fully functional autonomous vehicle in one embodiment. Alternatively, the parent vehicle 200 may include another semi-autonomous vehicle 100. The parent vehicle 200 preferably includes a chassis 205, a propulsion system 250 including a torque generator 210 coupled to a driveline 215 to generate propulsion torque, a control system 280, a sensing system 260, and a communications system 270. The communications system 270 is preferably signally coupled to the high-speed databus 275 and a wireless communications system 278. The wireless communication system 278 may include any suitable wireless communications protocol, including, e.g., one based upon IEEE 802.11. The parent vehicle 200 includes the target device 290. The target device 290 is preferably mounted on a rearward portion of the parent vehicle 200 in a suitable manner. The target device 290 may be a signal-reflective device, a radio-frequency transponder, or another suitable device that is discernible by a remote sensor, e.g., the front sensor 164 of the semi-autonomous vehicle 100.

The parent vehicle 200 preferably includes the human/machine interface (HMI) system 235, which communicates with suitable on-vehicle HMI devices including a steering wheel, an accelerator pedal, a brake pedal, a cruise control system, and a lane-change indicator on systems so equipped. In one embodiment, the cruise control system is controlled by an adaptive cruise control system 240. Adaptive cruise control systems are known and not described in detail herein. The HMI system 235 monitors operator inputs to the various on-vehicle HMI devices and communicates such information, e.g., accelerator pedal position, brake pedal position, a cruise control input, and lane-change indicator position to the control system 180 of the semi-autonomous vehicle 100. Other information of the parent vehicle 200 that is communicated to the semi-autonomous vehicle 100 preferably includes vehicle motion states of vehicle speed, acceleration, lateral speed and acceleration, yaw-rate, steering angle, and direction of travel, which are detectable by devices and algorithms that are elements the sensing system 260.

The parent vehicle 200 includes connector 202 suitable for coupling to the connector 16 of the non-load-bearing coupling mechanism 10 of the semi-autonomous vehicle 100. The connector 202 preferably includes a communications link to the high-speed databus 275. The connector 202 includes the mechanical coupling 211 that mechanically connects to the chassis 205 of the parent vehicle 200. In the embodiment shown in FIG. 2, connector 202' includes an electrical connection to a high-voltage electric power bus 212 of the parent vehicle 200'. The mechanical coupling 211 is couplable to the flexible mechanical link element 11 of connector 16 of the non-load-bearing coupling mechanism 10 of the semi-autonomous vehicle 100.

The parent vehicle 200 may be equipped with any suitable configuration for the propulsion system 250. The parent vehicle 200 may use liquid fuel, stored electric energy, or another suitable energy source to generate torque for propulsion. The driveline 215 may be any suitable torque-transfer system fabricated using known driveline components including, e.g., a transmission device and a transaxle. In one embodiment, the torque generator 210 of the propulsion system 250 includes a single multiphase electric motor that is rotatably attached to one of the wheels and is electrically connected to a high-voltage electrical power storage device via an electrical power inverter. In one embodiment, the torque generator 210 of the propulsion system 250 includes a plurality of multiphase electric motors that are rotatably attached to corresponding wheels and electrically connected to a high-voltage electrical power storage device via a plurality of electrical power inverters.

FIG. 2 depicts an embodiment of the parent vehicle 200'. The parent vehicle 200' includes propulsion system 250', which includes an internal combustion engine 210 and one or more electrically-powered torque machine(s) 252 configured to generate and transfer torque to the internal combustion engine 210 and/or the driveline 215'. The electrically-powered torque machine(s) 252 is preferably a multiphase electric motor that uses high-voltage electric power that may originate in the on-board electric energy storage system 225 to generate torque for vehicle propulsion, provide engine autostarting functionality, and provide other features. A high-voltage electrical energy power management system 220 manages high-voltage electric power flow including via the high-voltage electric power bus 212. In one embodiment the electrically-powered torque machine(s) 252 is rotatably attached to vehicle wheels. Each torque machine(s) 252 is preferably configured to function as a torque motor and as an electric power generator. Each torque machine(s) 252 electrically connects to a power inverter system 254 to convert high-voltage DC electric power to AC power for operating the torque machine(s) 252 and to convert AC power generated by the torque machine(s) 252 to high-voltage DC electric power that may be stored in the high-voltage electric power storage system 225. The propulsion systems 250 and 250' are meant to be illustrative.

Operation of the semi-autonomous vehicle 100 when coupled to the parent vehicle 200 includes monitoring information from the HMI system 235 and the adaptive cruise control system 240 of the parent vehicle 200 via the communications system 170. This includes monitoring the adaptive cruise control system 240 and operator inputs to the HMI system 235 to ascertain operator commands for operating the parent vehicle 200 through the steering wheel, the accelerator pedal, the brake pedal, and the lane-change indicator. Monitoring operation of the parent vehicle 200 includes monitoring information from the sensing system 260 of the parent vehicle 200 including vehicle motion states of vehicle speed, acceleration, lateral speed and acceleration, yaw-rate, steering angle, and direction of travel. Monitoring operation of the parent vehicle 200 further includes monitoring inputs from the spatial monitoring system 162 to determine a linear range, relative speed, and trajectory of the parent vehicle 200.

The control system 180 integrates and analyzes all of the aforementioned information from the parent vehicle 200 and the semi-autonomous vehicle 100, and determines control states for each of the braking system 130, steering system 140, and the propulsion system 150 to control speed, acceleration, and direction of travel of the semi-autonomous vehicle 100 such that it remains at a following distance of 1.0 m+/−0.4 m behind the parent vehicle 200 and in the same lane as the parent vehicle 200.

A control scheme of the control system 180 includes a lane centering scheme that operatively connected to the steering system.

A control scheme of the control system 180 includes a collision avoidance and preparation control system that is operatively connected to the braking system and the steering system. Another control scheme includes an autonomous parking control system operatively connected to the steering system, the braking system, and the propulsion system.

A control scheme of the control system 180 includes a safety chain control system 185 that is configured with suitable mechanisms to monitor structural integrity, signal integrity, and, on systems so equipped, electric power transfer integrity of the various elements of the coupling mechanism 10. This includes monitoring the high-speed communications link 15, the flexible mechanical link element 11, the connector 16, and the high-voltage electric power bus 12 on systems so equipped. The safety chain control system 185 is configured to effect a controlled operation of the semi-autonomous vehicle 100 when occurrence of a fault is detected, including a fault associated with the coupling mechanism 10. The safety chain control system 185 is configured to interrupt and discontinue electric power flow through the high-voltage electric power bus 12 of the coupling mechanism 10. In one embodiment, the safety chain control system 185 includes capability to autonomously control operation of the semi-autonomous vehicle 100 to effect a controlled stopping maneuver of the semi-autonomous vehicle 100 independently of the parent vehicle 200. In one embodiment, the safety chain control system 185 is configured to effect communication to inform the parent vehicle 200 that the semi-autonomous vehicle 100 is properly connected thereto, and to inform the parent vehicle 200 of occurrence of a fault, including a in the coupling mechanism 10. The parent vehicle 200 preferably is equipped with an audible device or visual display to communicate with the vehicle operator information related to integrity of the coupling mechanism 10.

In one embodiment, the semi-autonomous vehicle 100 is an electrically-propelled vehicle with an overall weight of 680 kg (1500 lbs.) and a payload (i.e., batteries and stowage) capacity of at least 460 kg (1000 lbs.). The semi-autonomous vehicle 100 preferably has a removable body element 190. The external design of the body element 190 preferably complements the design of the parent vehicle 200, with an aerodynamic profile that minimizes drag of the combination of the parent vehicle 200 in conjunction with the semi-autonomous vehicle 100. In one embodiment, the body element 190 may be replaced, thus allowing an operator to select a body element 190 for the semi-autonomous vehicle 100 that conforms to the selected parent vehicle 200. The body element 190 for the semi-autonomous vehicle 100 is designed to conform to body contours of the parent vehicle 200 to minimize drag.

In one embodiment, the controller 180 is programmable, thus allowing an operator or a skilled technician to program the controller 180 such that the control system for the semi-autonomous vehicle 100 conforms to the selected parent vehicle 200, taking into account features of the parent vehicle 200 and communications protocols associated therewith. One feature of the parent vehicle 200 that may be provided by the semi-autonomous vehicle 100 may include rear obstacle detection.

The repository 105 of the semi-autonomous vehicle 100 provides cargo-carrying capacity to the parent vehicle 200 without requiring additional trailer towing features such as added body structure or powertrain cooling systems. The semi-autonomous vehicle 100 autonomously follows the parent vehicle 200 bearing its own weight and employing its own propulsion, braking, and steering systems. The semi-autonomous vehicle 100 connects to the parent vehicle 200 without necessity of manipulating a hitch or jack, or of verifying a mechanical connection.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A semi-autonomous vehicle, comprising:
a chassis including a repository on a plurality of wheels;
a propulsion system, a steering system, a braking system, an extra-vehicle communications system, and an extra-vehicle sensory system;
a control system operatively coupled to the propulsion system, the steering system, and the braking system and signally connected to the extra-vehicle sensory system and the extra-vehicle communications system; and
a non-load-bearing coupling mechanism comprising a connector, a flexible mechanical link element and a communications link.

2. The semi-autonomous vehicle of claim 1, wherein the non-load-bearing coupling mechanism is configured to couple to a parent vehicle.

3. The semi-autonomous vehicle of claim 2, wherein the non-load-bearing coupling mechanism is coupled to the parent vehicle when the connector of the non-load-bearing coupling mechanism mechanically connects to a connector of the parent vehicle, the extra-vehicle communications system communicates with a communications system of the parent vehicle, and the extra-vehicle sensory system detects a target device mounted on the parent vehicle.

4. The semi-autonomous vehicle of claim 1, wherein the control system is configured to control speed, acceleration, and direction of travel of the semi-autonomous vehicle.

5. The semi-autonomous vehicle of claim 4, wherein the control system configured to control speed, acceleration, and direction of travel of the semi-autonomous vehicle such that the semi-autonomous vehicle remains at a prescribed following distance behind a parent vehicle and in a common lane with the parent vehicle when the non-load-bearing coupling mechanism.

6. The semi-autonomous vehicle of claim 3, wherein the control system includes a safety chain control system monitoring structural and signal integrity of the non-load-bearing coupling mechanism.

7. The semi-autonomous vehicle of claim 6, wherein the safety chain control system monitoring structural and signal integrity of the non-load-bearing coupling mechanism is configured to detect a fault associated with one of the non-load-bearing coupling mechanism when mechanically connected to the connector of the parent vehicle, the extra-vehicle communications system signally when connected to the communications system of the parent vehicle, and the extra-vehicle sensory system when detecting the target device mounted on the parent vehicle.

8. The semi-autonomous vehicle of claim 1, wherein the propulsion system is configured to transfer torque to at least one of the plurality of wheels comprises an electrically-powered motor coupled to said at least one of the plurality of wheels.

9. The semi-autonomous vehicle of claim 8, wherein the non-load-bearing coupling mechanism further comprises a high-voltage DC electrical power bus electrically coupled to a high-voltage electrical energy storage system, wherein the high-voltage DC electrical power bus is configured to electrically couple to a high-voltage electrical energy storage system of a parent vehicle.

10. The semi-autonomous vehicle of claim 1, wherein the propulsion system is configured to transfer torque to at least one of the plurality of wheels and comprises an internal combustion engine mechanically coupled to said at least one of the plurality of wheels.

11. The semi-autonomous vehicle of claim 1, wherein the propulsion system is configured to transfer torque to at least one of the plurality of wheels includes a fuel cell electrically coupled to an electrically-powered motor coupled to said at least one of the plurality of wheels.

12. The semi-autonomous vehicle of claim 1, wherein the extra-vehicle communications system comprises a wireless communications system configured to communicate with a communication system of a parent vehicle.

13. The semi-autonomous vehicle of claim 1, wherein the extra-vehicle sensory system comprises a front sensor configured to detect a target device mounted on a parent vehicle.

14. The semi-autonomous vehicle of claim 13, wherein the extra-vehicle sensory system is configured to determine a linear range, a relative speed, and a trajectory of the parent vehicle correlated to the detected target device mounted on the parent vehicle.

15. The semi-autonomous vehicle of claim 1, wherein the flexible mechanical link element comprises a high tensile strength cable.

16. A semi-autonomous vehicle configured to follow a parent vehicle, consisting essentially of:
- a chassis including a repository supported on a plurality of wheels;
- a propulsion system, a steering system, a braking system, an extra-vehicle communications system, and an extra-vehicle sensory system;
- a control system operatively coupled to the propulsion system, the steering system, and the braking system and signally connected to the extra-vehicle sensory system and the extra-vehicle communications system; and
- a non-load-bearing coupling mechanism couplable to the parent vehicle and comprising a connector, a flexible mechanical link element and a communications link.

17. The semi-autonomous vehicle of claim 16, wherein the control system controls speed, acceleration, and direction of travel of the semi-autonomous vehicle such that the semi-autonomous vehicle remains at a prescribed following distance behind the parent vehicle and a common lane with the parent vehicle when the non-load-bearing coupling mechanism is coupled to the parent vehicle.

18. The semi-autonomous vehicle of claim 17, wherein the parent vehicle comprises an autonomous vehicle.

19. The semi-autonomous vehicle of claim 17, wherein the parent vehicle comprises a semi-autonomous vehicle.

* * * * *